(12) United States Patent
Crisler et al.

(10) Patent No.: US 10,735,455 B2
(45) Date of Patent: Aug. 4, 2020

(54) SYSTEM FOR ANONYMOUSLY DETECTING AND BLOCKING THREATS WITHIN A TELECOMMUNICATIONS NETWORK

(71) Applicant: Dark3, LLC, Alexandria, VA (US)

(72) Inventors: Vincent Owen Crisler, Alexandria, VA (US); Theresa Marie Payton, Charlotte, NC (US)

(73) Assignee: Dark3, LLC, Alexandria, VA (US)

( * ) Notice: Subject to any disclaimer, the term of this patent is extended or adjusted under 35 U.S.C. 154(b) by 359 days.

(21) Appl. No.: 15/174,775

(22) Filed: Jun. 6, 2016

(65) Prior Publication Data

US 2016/0359900 A1     Dec. 8, 2016

Related U.S. Application Data

(60) Provisional application No. 62/171,065, filed on Jun. 4, 2015, provisional application No. 62/171,077, filed on Jun. 4, 2015.

(51) Int. Cl.

| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *H04L 12/26* | (2006.01) |

(52) U.S. Cl.
CPC ...... *H04L 63/1441* (2013.01); *H04L 63/1408* (2013.01); *H04L 63/1425* (2013.01); *H04L 43/062* (2013.01)

(58) Field of Classification Search
USPC .......................................................... 726/23
See application file for complete search history.

(56) References Cited

U.S. PATENT DOCUMENTS

| | | | |
|---|---|---|---|
| 2002/0032871 A1* | 3/2002 | Malan | H04L 41/22 726/23 |
| 2012/0216271 A1* | 8/2012 | Cooper | H04L 63/0254 726/12 |
| 2014/0007238 A1* | 1/2014 | Magee | G06F 21/577 726/24 |
| 2015/0121449 A1* | 4/2015 | CP | H04L 63/145 726/1 |
| 2015/0264083 A1* | 9/2015 | Prenger | G06F 16/285 726/23 |

* cited by examiner

*Primary Examiner* — Jeffrey C Pwu
*Assistant Examiner* — Samuel Ambaye
(74) *Attorney, Agent, or Firm* — Squire Patton Boggs (US) LLP

(57) ABSTRACT

A system is provided for anonymously detecting and blocking threats within a telecommunications network. A network analyzer of the system may intercept traffic, or receive log files, related to traffic that passes over the network, collect metadata that includes values of data attributes associated with the traffic, interpret the metadata and therefrom generate and transmit a request for an associated threat score for the value of a data attribute, and receive the associated threat score and based thereon initiate a block or redirection of the traffic. A score requestor of the system may receive and serve the request by either returning the score from local storage or otherwise, generating and transmitting a secondary request to a scoring engine configured to calculate the associated threat score and the associated threat score to the score requestor to return to the network analyzer.

13 Claims, 13 Drawing Sheets

Figure 1:
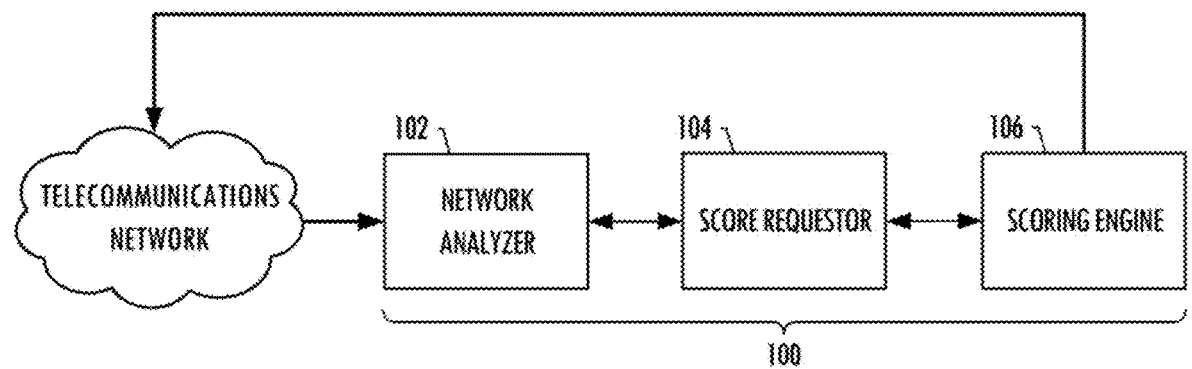

SYSTEM FOR ANONYMOUSLY DETECTING AND BLOCKING THREATS WITHIN A TELECOMMUNICATIONS NETWORK

CROSS-REFERENCE TO RELATED APPLICATION(S)

The present application claims priority to U.S. Provisional Patent Application No. 62/171,065, entitled: Signal-based Threat Scoring for Cybersecurity, and U.S. Provisional Patent Application No. 62/171,077, entitled: Real-Time, Anonymous Sharing of Cybersecurity Data via Black Box, both filed on Jun. 4, 2015, the contents of both of which are incorporated by reference in their respective entireties.

TECHNOLOGICAL FIELD

The present disclosure relates generally to threat detection within a telecommunications network and, in particular, to anonymously detecting and blocking, in real-time, threats within a telecommunications network.

BACKGROUND

Internet traffic is often monitored by business corporations or third-party entities to detect known security threats, in addition to detecting new and less apparent security threats. Current solutions lack the ability to anonymize the identity of business corporations during an attempt to determine potential security breaches within their respective networks. Further, the current solutions lack the ability to provide real-time prevention of security breaches during the time that potential threats are initially detected. Therefore, it may be desirable to have a system and method that addresses at least some of these issues, and improves upon existing practices.

BRIEF SUMMARY

Example implementations of the present disclosure are directed to an improved system, method and computer-readable storage medium for anonymously detecting and blocking threats within a telecommunications network. In particular, the system anonymizes the identity of entities attempting to detect and further mediate security threats or breaches, and provides real-time detection and prevention of security threats within a telecommunications network. The present disclosure includes, without limitation, the following example implementations. In some example implementations, a method is provided for implementing a system for anonymously detecting and blocking threats within a telecommunications network. The system includes a network analyzer, a score requestor and a scoring engine distributed within the telecommunications network. The method may include, at a network analyzer, intercepting traffic, or receiving a log file related to traffic, that passes over the telecommunications network. The method may also include, at the network analyzer, collecting metadata that includes values of data attributes associated with the traffic based on the traffic so intercepted or log files so received. The method may also include, at the network analyzer, interpreting the metadata and therefrom generating and transmitting a request, to the score requestor, for an associated threat score for the value of a data attribute of the data attributes in which the request includes at least the value of the data attribute. The method may also include, at the network analyzer, receiving the associated threat score from the score requestor and based thereon initiating a block or redirection of the traffic.

The method may also include, at the score requestor, receiving a request, from the network analyzer, for an associated threat score for a value of a data attribute of traffic that passes over the telecommunications. The method also includes, at the score requestor, serving the request from a local storage in an instance in which the associated threat score is locally stored after having been previously requested by another network analyzer; or otherwise, serving the request from the scoring engine based on a secondary request. The secondary request being without the value and instead including a transformation of the value to remove any portion from which the network analyzer is identifiable.

In some example implementations of the method of the preceding or any subsequent example implementation, or any combination thereof, the data attributes include sources and destinations of the traffic, network port and network protocol identifiers associated with the traffic, dates and timestamps of the traffic, and frequency and pattern identifiers of the traffic.

In some example implementations of the method of any preceding or any subsequent example implementation, or any combination thereof, transmitting the request, at the network analyzer, includes encrypting and then transmitting the request, the score requestor being configured to decrypt and then serve the request.

In some example implementations of the method of any preceding or any subsequent example implementation, or any combination thereof, the method further comprises, at the network analyzer, determining if the associated threat score for the value of the data attribute is locally stored at the network analyzer including, generating and transmitting the request, and receiving the associated threat score from the score requestor, in an instance in which the associated threat score is not locally stored at the network analyzer; and in another instance in which the associated threat score is locally stored at the network analyzer, retrieving the associated threat score from local storage of the network analyzer and based thereon automatically initiating the block or redirection of the traffic.

In some example implementations of the method of any preceding or any subsequent example implementation, or any combination thereof, initiating, at the network analyzer, the block or redirection of the traffic includes notifying an end-user of a threat associated with the traffic, and initiating the block of the traffic, in an instance in which the associated threat is above the predetermined threshold; or otherwise, initiating the redirection of the traffic to an identified source or destination in an instance in which the associated threat is below a predetermined threshold.

In some example implementations of the method of any preceding or any subsequent example implementation, or any combination thereof, receiving the request from, and serving the request to, the network analyzer respectively includes, at the score requestor, assigning a token to the request upon receipt, and returning the associated threat score to the network analyzer based at least in part on the token.

In some example implementations of the method of any preceding or any subsequent example implementation, or any combination thereof, serving, at the score requestor, the request from the scoring engine based on a secondary request includes generating and transmitting the secondary request to the scoring engine configured to receive the secondary request, and in response thereto, calculate the associated threat score and return the associated threat score to the score requestor to return to the network analyzer.

In some example implementations of the method of any preceding or any subsequent example implementation, or any combination thereof, the scoring engine being configured to calculate the associated threat score includes being configured to collect metadata associated with the value of the data attribute, and based thereon determine whether the value of the data attribute is associated with a known or predicted threat.

In some example implementations, an apparatus is provided for anonymously detecting and blocking threats within a telecommunications network. The apparatus comprises a processor and a memory storing executable instructions that, in response to execution by the processor, cause the apparatus to implement a number of subsystems, such as a network analyzer, score requestor, and scoring engine which may be configured to at least perform the method of any preceding example implementation, or any combination thereof.

In some example implementations, a computer-readable storage medium is provided for anonymously detecting and blocking threats within a telecommunications network. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Figure 2:
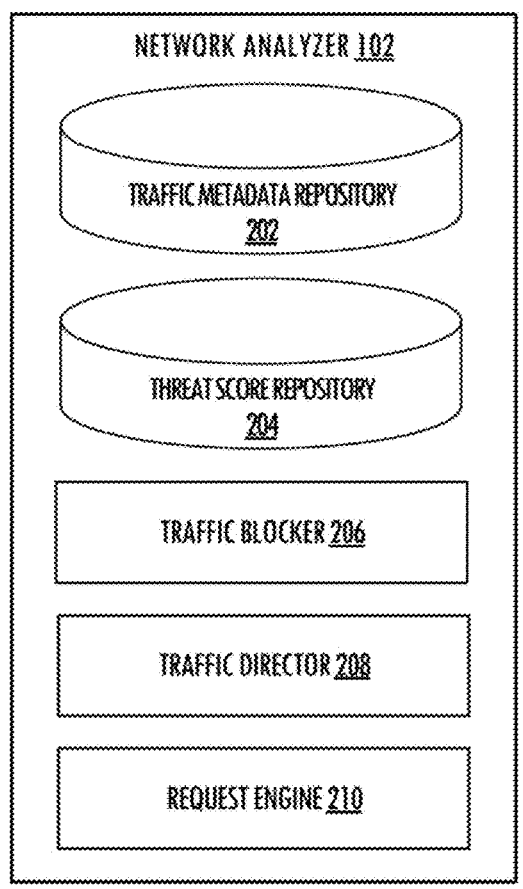
Figure 3:
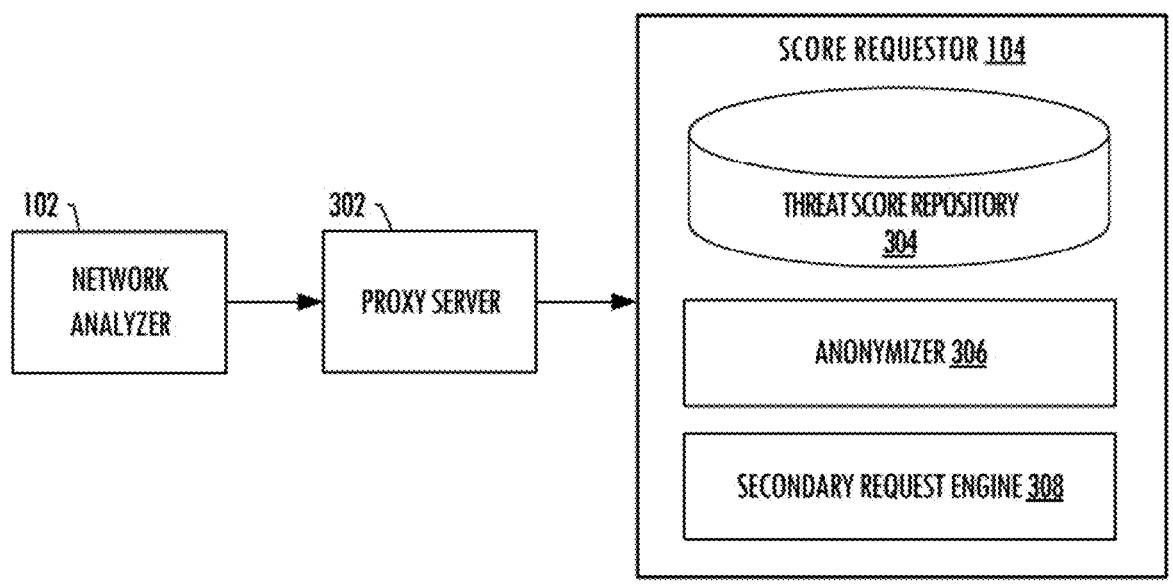
Figure 4:
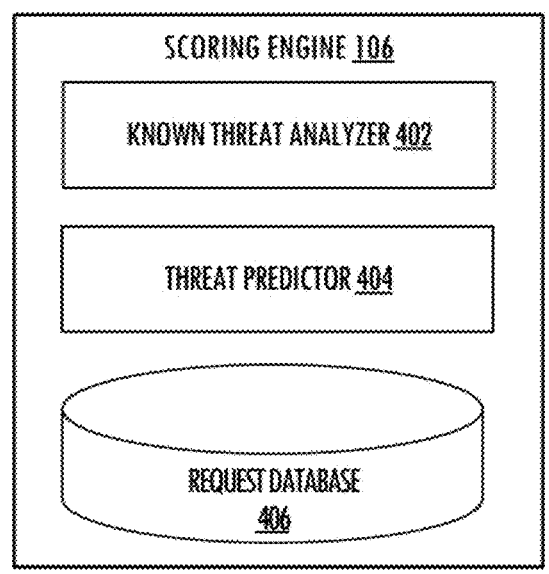
Figure 10:
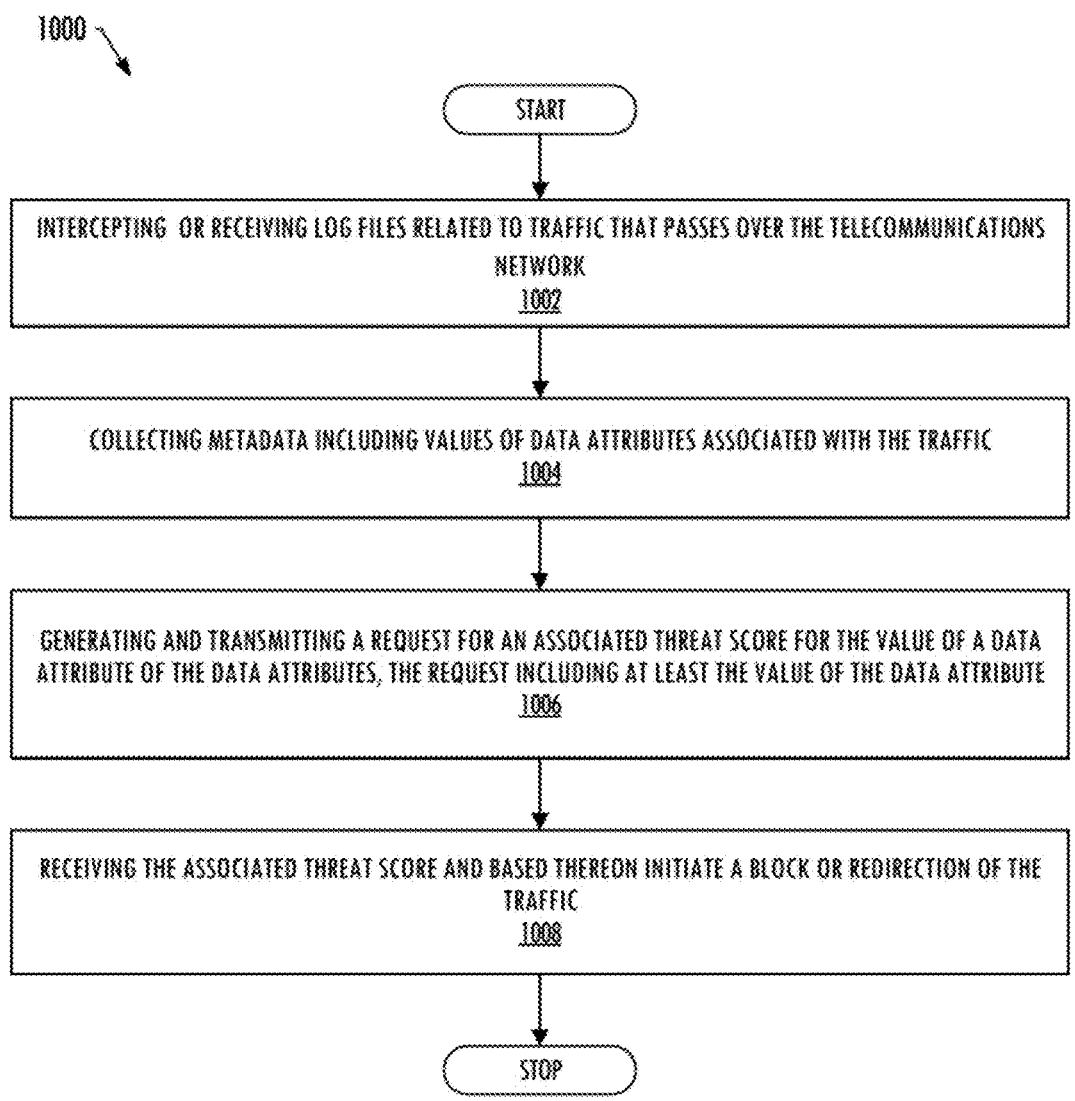
Figure 11:
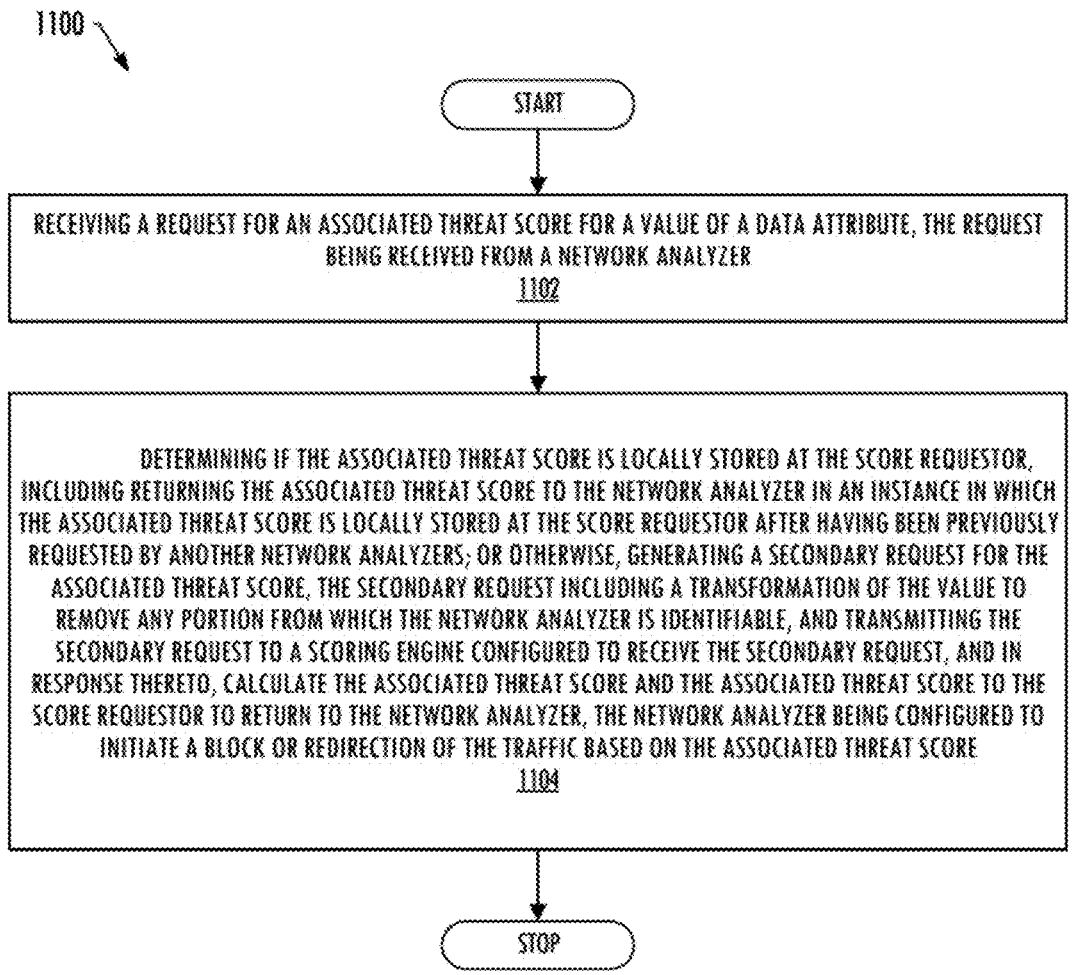
Figure 12:
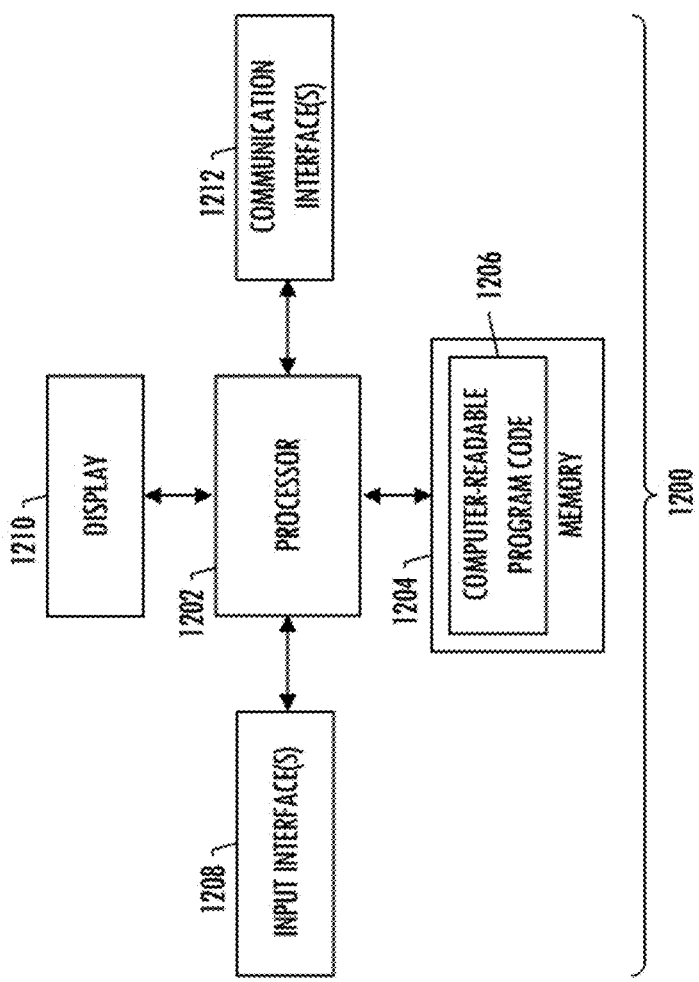

Having thus described example implementations of the disclosure in general terms, reference will now be made to the accompanying drawings, which are not necessarily drawn to scale, and wherein:

FIG. 1 is an illustration of a system for anonymously detecting and blocking threats within a telecommunications network, according to example implementations of the present disclosure;

FIGS. 2, 3 and 4 respectively illustrate a network analyzer, score requestor and scoring engine of the system of FIG. 1, according to example implementations of the present disclosure;

FIGS. 5, 6, 7A, 7B, 7C, 7D, 8 and 9 more particularly illustrate aspects of the system of FIG. 1, according to example implementations of the present disclosure;

FIGS. 10 and 11 are flow diagrams illustrating various operations of a method for anonymously detecting and blocking threats within a telecommunications network, according to example implementations of the present disclosure; and FIG. 12 illustrates an apparatus according to example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to threat detection within a telecommunications network and, in particular, to anonymously detecting and blocking, threats within a telecommunications network in real-time. Example implementations will be primarily described in conjunction with data networking and security applications. It should be understood, however, that example embodiments may be utilized in conjunction with a variety of other applications not explicitly expressed herein.

Example implementations of the present disclosure are more particularly directed to identifying inbound and outbound traffic to a network, and aggregating metadata associated with the traffic. The metadata is shared over a real time, fully anonymous network to a remote system that collects the information, and determines a threat score for various data attributes and returns the scores to an appropriate front end-system (e.g., a network analyzer). Upon receiving these scores, the front-end system automatically takes action to block or redirect associated traffic to provide near real time protection against cyber security threats. Some implementations further provide threat scoring based on attributes include the size of an organization and/or the sector of the economy in which it operates.

The system utilizes an intermediate communication system (e.g., a score requestor) that supports encrypted connections between end point devices and executes algorithms (e.g., mathematical formulas) against identifying information to obfuscate that information from a back-end processing system (e.g., a scoring engine). In addition, the intermediate system is unable to determine the source of the requests for a threat score due to the implementation of the system architecture and therefore cannot attribute collected data to any specific front-end system.

When data is received by the back-end processing system it is automatically processed through a variety of custom algorithms that collect additional metadata such as the owning organization for the internet protocol (IP) address, routing data for the IP address or domain name, and dates and times that certain administrative activities occurred as associated with IP addresses and domain names. All of the collected attributes are processed through custom algorithms to perform predictive threat analysis without any human interaction.

FIG. 1 illustrates a system 100 for anonymously detecting and blocking threats within a telecommunications network according to example implementations of the present disclosure, which may be simply referred to as the "system" herein. As used herein, a telecommunications network may include a collection of terminal nodes that are connected via transmission links so as to enable telecommunication between the terminals. In particular, the transmission links connect the nodes together, and the nodes use circuit switching, message switching and/or packet switching to pass signals through the correct links and nodes to reach the correct destination terminal. Examples of suitable telecommunications networks may be or include computer networks, the Internet, telephone networks, and the like.

The system 100 may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

In accordance with example implementations of the present disclosure, the system 100 is configured to perform various functions or operations to enable anonymous detection and blocking of threats within a telecommunications network. The system may be configured to intercept traffic, or receive a log file related to traffic, that passes over a telecommunications network to collect metadata that includes values of data attributes associated with the traffic based on the traffic so intercepted or log files so received. The system may then interpret the metadata and therefrom generate a request for a threat score for the value of the data attribute in which the request includes at least the value of the data attribute. The request may be transmitted for service to return, and in some instances further calculate, the associated threat score such that the identity of the requesting entity remains anonymous. Using the associated threat score and based thereon, the system may initiate a block or redirection of the traffic.

The system 100 may include one or more of each of a number of different subsystems (each an individual system) coupled to one another for performing one or more functions or operations. As shown in FIG. 1, for example, the system may include a network analyzer 102, score requestor 104 and/or scoring engine 106 that may be coupled to one another. Although shown as part of the system, one or more of the network analyzer, score requestor and/or scoring engine may instead be separate from but in communication with the system. It should also be understood that one or more of the subsystems may function or operate as a separate system without regard to others of the subsystems. And further, it should be understood that the system may include one or more additional or alternative subsystems than those shown in FIG. 1.

FIGS. 2, 3 and 4 more particularly illustrate the network analyzer 102, score requestor 104 and scoring engine 106, respectively. As explained in greater detail below, the network analyzer, score requestor and scoring engine may be configured to perform respective functions or operations of the system 100. As shown in FIG. 2, for example, the network analyzer may include a traffic metadata repository 202, threat score repository 204, traffic blocker 206, traffic director 208 and request engine 210 that may each be configured to perform respective functions or operations of the system. It should be noted that although the example implementations herein are discussed with reference to a single network analyzer, the system may include a plurality of network analyzers. In these examples, each network analyzer may be configured to intercept traffic at a network port of a respective computing device to which the network analyzer is coupled. For example, the network analyzer may be physically connected to a telecommunications network and configured to monitor network traffic via a network tap, span port, traffic mirroring, log monitoring, or another suitable means for monitoring network traffic.

The network analyzer 102 may be configured to intercept traffic, or receive log files related to traffic, that passes over a telecommunications network. The network analyzer may then collect metadata that includes values of data attributes associated with the traffic based on the traffic so intercepted or log files so received'. The data attributes may include, for example, sources and destinations of the traffic (e.g., an Internet Protocol (IP) address or domain name), network port and network protocol identifiers associated with the traffic, dates and timestamps of the traffic, frequency and pattern identifiers of the traffic, and other suitable metadata not explicitly expressed herein. Further the collected metadata may include first and last instances at which the value was observed, a number of observations of the value per time period (e.g., a number of observations per day). In some examples, the metadata including the values of the data attributes may be stored locally at the network analyzer within a traffic metadata repository 202.

In some example, the network analyzer 102 may be configured to transform the metadata into a compacted and/or normalized dataset that allows for long term storage within the traffic metadata repository 202 without significant size implications. This data is stored in a database in the sensor and is used in a user interface (UI) to display the data in a form that is easy to interact with by an untrained, unsophisticated user.

The network analyzer 102 may be configured to initiate a block or redirection of the intercepted traffic based on threats scores associated with the values of the data attributes. The network analyzer may also be configured to store the threat scores locally within a threat score repository 204. In some instances, the threat scores of the data attributes are stored within the threat score repository during the time at which the traffic is initially intercepted, and in other instances the threat scores are not stored during the time of traffic interception and the network analyzer is required to generate a request to receive the associated threat scores.

The threat score repository 204 may therefore be configured to determine, for each data attribute associated with the traffic, if a threat score associated with the value of the data attribute is stored therein. More particularly, the threat score repository is configured to determine if the threat score for the value is stored therein during the time at which the traffic is intercepted. In an instance in which the associated threat score is stored within the threat score repository, the traffic blocker 206 or traffic director 208 may be respectively configured to retrieve the associated threat score from the threat score repository and based thereon automatically initiate a block or a redirection of the traffic.

Otherwise, in an instance in which the associated threat score is not stored within the threat score repository 204, the request engine 210 may be configured to interpret the metadata and therefrom generate a request for the associated threat score and transmit the request to the score requestor 104. In these examples, the request may include at least the value of the data attribute. Further in some examples, the request engine may be configured to encrypt the request prior to transmission to the score requestor. Upon receipt of the threat score from the score requestor, the threat score repository may be configured store the threat score, and the traffic blocker 206 or traffic director 208 may be respectively configured to initiate the block or redirection of the current traffic or any subsequent traffic having metadata that includes the value of the data attribute.

As previously indicated, the network analyzer 102 may be configured to initiate a block or redirection of the intercepted traffic based on threats scores associated with the values of the data attributes. In particular, in an instance in which the associated threat is above a predetermined threshold, the threat blocker 206 may be configured to notify an end-user of a threat associated with the traffic, and initiate a block of the traffic. Alternatively, in an instance in which the associated threat score is below a predetermined threshold, the threat director 208 may be configured to initiate the redirection of the traffic to an identified source or destination.

Now referring to FIG. 3, as shown, the score requestor 104 may include a threat score repository 304, anonymizer 306, and secondary request engine 308 that may each be configured to perform respective functions or operations of the system 100. As previously indicated, the score requestor may be configured receive, from a network analyzer 102, a request for an associated threat score for a value of a data attribute. As shown in FIG. 3, the request may be received from the network analyzer through a proxy server 302 to obscure the source of the requests (e.g., the requesting network analyzer). In these examples, the proxy server has no visibility of the data within the passing network traffic, and the score requestor has no visibility regarding the source of the request. In this configuration, only the network analyzer and score request have knowledge of the data within the request.

As previously indicated, in some examples the request engine 210 of the network analyzer 102 may be configured to encrypt the request prior to transmission the score requestor. In these examples, the score requestor may be configured to decrypt the request from the network analyzer, and then serve the request.

Similar to the threat score repository 204 of the network analyzer 102, the threat score repository 304 of the score requestor 104 may also be configured to determine, for each request, if the threat score is locally stored therein. In an instance in which the associated threat score is stored within the threat score repository at the initial receipt of the request, the threat score repository may be configured to serve the request from the threat score repository which may include returning the associated threat score to the network analyzer. The threat score repository may include a cache of recently scored values. For example, the threat score for a value of a data attribute may be stored within the threat score repository after being previously requested by another network analyzer. In these examples, the threat score may be configured to determine if a threat score is stored therein by searching for a match that corresponds to the value of the data attribute.

Otherwise, in an instance in which the associated threat score is not stored within the threat score repository 304, the score requestor may be configured to serve the request from the scoring engine 106 based on a secondary request. In particular, the anonymizer 306 may be configured to transform the value of the data attribute to remove any portion of the value from which the requesting network analyzer 102 may be identifiable, and the secondary request engine 308 may be configured to generate and transmit a secondary request for the associated threat score. The secondary request may then be transmitted to the scoring engine. The secondary request may be without the value and instead include the transformation of the value such that the identity of the network analyzer remains anonymous to the scoring engine. In particular, the anonymizer may be configured to obscure the source of a request from the scoring engine to protect an associated users' privacy. In some examples, the anonymizer may be configured to execute an obfuscation algorithm in which the algorithm further removes the ability to associate the network analyzer with any specific data sets. The obfuscation algorithm may be an irreversible mathematical algorithm that transforms the values of data attributes. The algorithm or other suitable methods for performing the transformation may be unknown to an operator of the score requestor such that the transformation is protected from reverse engineering by a third party.

In some examples, the anonymizer 306 may be further configured to assign the request a token for obscuring the identity of the network analyzer 102. The token allows for providing a constant primary key for the values of the data attributes, without having visibility of the computing device providing the values. In particular, the anonymizer may be configured to assign a token (e.g., a numeric or alphanumeric identifier) to the request upon receipt. The score requestor 104, and more particularly, the threat score repository 304, may then subsequently serve the request by returning and/or transmitting the associated threat score to the network analyzer based at least in part on the assigned token. The token may be further provided to the requesting network analyzer. In these examples, prior to receiving the requested threat score, the network analyzer may be configured to utilize the token to periodically query the score requestor for the threat score.

Now referring to FIG. 4, as shown, the scoring engine 106 may include a known threat analyzer 402, threat predictor 404, and request database 406 that may each be configured to perform respective functions or operations of the system 100. As previously indicated, the score requestor may be configured receive, from the score requestor 104, a secondary request for an associated threat score for a value of a data attribute. The scoring engine may then calculate and return the associated threat score to the score requestor to return to the network analyzer 102. The threat score may be calculated independent of human input or interaction. This process may allow for the system 100 to further obscure the methodology utilized by the scoring engine to calculate a threat score in an event that identity sensitive information is utilized or required to calculate the threat scores. In some examples, the score requestor includes a plurality of score requestors that are each coupled to a respective network analyzer. In these examples, the scoring engine may be configured to return a threat score the plurality of score requestors despite the threat score being requested by an individual network analyzer.

In some examples, the scoring engine 106 may be configured to collect metadata associated with the value of the data attribute, and based thereon the known threat analyzer 402 or threat predictor 404 may be respectively configured to determine whether the value of the data attribute is associated with a known or predicted threat. For example, the threat analyzer may be configured to analyze a collection of commercial and/or third part data sources (e.g., known blacklists, spam lists, or malware lists) for indications that the value of a data attribute is a threat. The threat predictor may utilize predictive analytics to determine if the value is a potential threat. In some examples, the scoring engine may be configured to execute an algorithm for determining the threat score.

In some examples, the scoring engine 106 may be configured to quantify the threat score such as quantifying the likelihood of a threat associated with the value over a period time (e.g., a threat intensity), per IP address (e.g., an IP score), per domain name (e.g., a domain score), per email (e.g., an email score), and the like. In some examples, the calculated threat score may be stored in a request database 406 to enable additional analytics against a data set of network traffic observed from other sources of network traffic.

In these examples, the threat intensity score determined based at least in part on methodology that includes kinetic physics, and in particular the moment of inertia in which the threat intensity is defined as the magnitude or level of threat facing a network at a given time (e.g., within an hour) or over a period time (e.g., over a day). The threat intensity score may be calculated, for example, once every hour, and at the culmination of a 24 hour period such that a user is able to compare the threat intensity between hours and days. In some examples the threat intensity score may be calculated using the following equation:

$$\sum \frac{S \geq a}{n} + b^{-2}(\Sigma(S \geq c - d)^2)$$

where, S=a Score for the value of the data attribute, n=a total number of scores, and a, b, and c are numeric values.

Further in these examples, a value attribute score (e.g., an IP score, domain score) may be generated for values (e.g., IP addresses, domain names) on a known threat list. The value attribute score may be calculated using four factors including trustworthiness of a source (T), a neighborhood score (N) (e.g., geolocation, classless inter-domain routing (CIDR), (CIDR ORG), autonomous system number (ASN), and the like), a likelihood (L) of the value being associated with threat activity, and a Half-life (H), and numerical multipliers or additives (i). In these examples, if the value is on a known threat list, then the following equation may be applied:

IP=$i*T+N+L+H$.

Alternatively, if the value is not on a known threat list, the following equation may be applied:

IP=$i+N+L+H$, in which the equation excludes the trustworthiness factor (T).

An email score may be calculated based on known threat, a likelihood (L) of the email being associated with threat activity, and a half-life. In some examples, the email score may be calculated by generating the score for the associated IP address and email domain, and setting the overall score for the email to be the largest of the generated scores.

Figure 5:
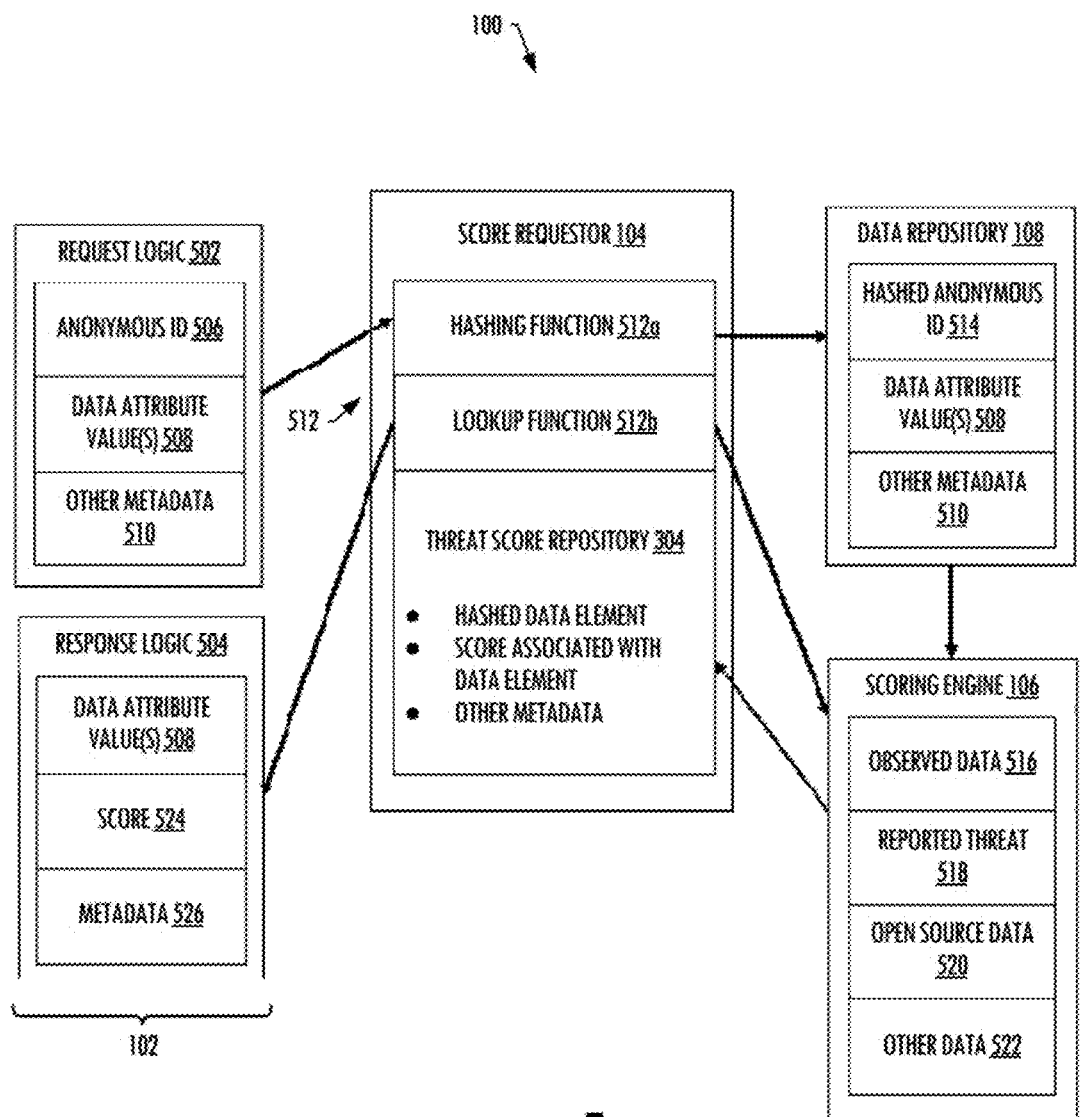

To further illustrate example implementations of the present disclosure, reference will now be made to FIGS. 5-9. FIG. 5 illustrates a more particular example of the system 100 for anonymously detecting and blocking threats within a telecommunications network. As shown, the network analyzer 102 may include request logic 502 and corresponding response logic 504 that may be executed by the request engine 210. The request logic may be configured to formulate a request from the network analyzer to the score requestor 104. In accordance with example implementations, the request may include a minimal amount of data to request a score from the score requestor. In some examples, statistics associated with a connection (e.g. IP address, browser, host, etc.) between the network analyzer and score requestor are either not logged or obfuscated.

The request may be received over a connection that has been secured through encryption or another form of point-to-point security (e.g., proxy server 302). In some examples, the request includes at least a version of a computing devices anonymous identifier (ID) 506, the computing device being coupled to the network analyzer 102 such that the anonymous ID is only known and recorded within the network analyzer. The process utilized to obfuscate the anonymous ID may be unique to each computing device, and the anonymous ID may have sufficient complexity to prevent reverse engineering of the ID. As also shown, the request may also include the value of the data attribute 508 requested for lookup in the score requestor, and perhaps other metadata 510.

The score requestor 104 may further include logic 512, such as a hashing function 512a and a lookup function 521b. In some examples, the hashing function 512a may be executed by the anonymizer 306 and the lookup function may be executed by the threat score repository. The hashing function may be configured to perform a one-way obfuscation of the data received from the network analyzer 102 via the request from request engine 210. The hashing function may be secured to prevent reverse engineering in the event an individual gains physical access to the formula, and may be only known to the service provider. This hashing function may be utilized to obfuscate the anonymous ID 506 (e.g., an obfuscation algorithm), to support the lookup in the threat score repository, and potentially to obfuscate other metadata intended for general statistical use.

The lookup function 512b may be executed by the threat score repository 304 and configured to receive both a hashed value for the value of the data attribute and an un-hashed value. The hashed value may be utilized to perform a lookup against the threat score repository to see if a score is known for the value of the data attribute. In the event that it is known, a score may be returned via a response through the response logic 504; otherwise, the raw data may be sent to the scoring engine 106 for an estimated score. Once an estimated score is calculated, it may be returned via a response. The content of the response for a "known" value may be identical to that of an "estimated" value to obfuscate what data "is" and "is not" known by the score requestor. The threat score repository 304 may be utilized to store obfuscated data and the associated scores. This storage technique may prevent the ability for an individual with access to data from ascertaining what data "is" and "is not" known by the score requestor 104.

In some examples, the system 100 may further include a data repository 108. The data repository may be a secure, centralized data repository configured to receive data from the score requestor 104, such as in a secure format that utilizes some form of encryption or other point-to-point security. This data repository may enable the calculation of trends and patterns based on observed network activity within the network analyzer 102 and other network analyzers. This observed data may be utilized for scoring purposes; and in some examples, the observed data may minimally include a hashed version of the anonymous ID 514 and the un-hashed value of the data attribute 508, and may also include other metadata 118.

In the event a score is not known by the score requestor 104, the score requestor may send raw, un-hashed data to the scoring engine 106, such as in a secure format that utilizes some form of encryption or other point-to-point security. This transmission may or may not include the anonymous ID, but will be performed in a manner that ensures anonymity of the data. The scoring engine may combine observed data 516 from the data repository 106, reported threat information 518, open source data 520 and/or other data 522 to calculate scores for data on a regular and/or as-needed basis.

A response to the request from the score requestor 104 may be sent to the response logic 504 of the network analyzer 102, and it may include the original value of the data attribute 508 provided in the request. The response may also include a score 524 for that a data, as well as perhaps additional metadata 526 that may help to provide context for the network analyzer. This message may be sent in a secure format that utilizes some form of encryption or other point-to-point security.

Figure 6:
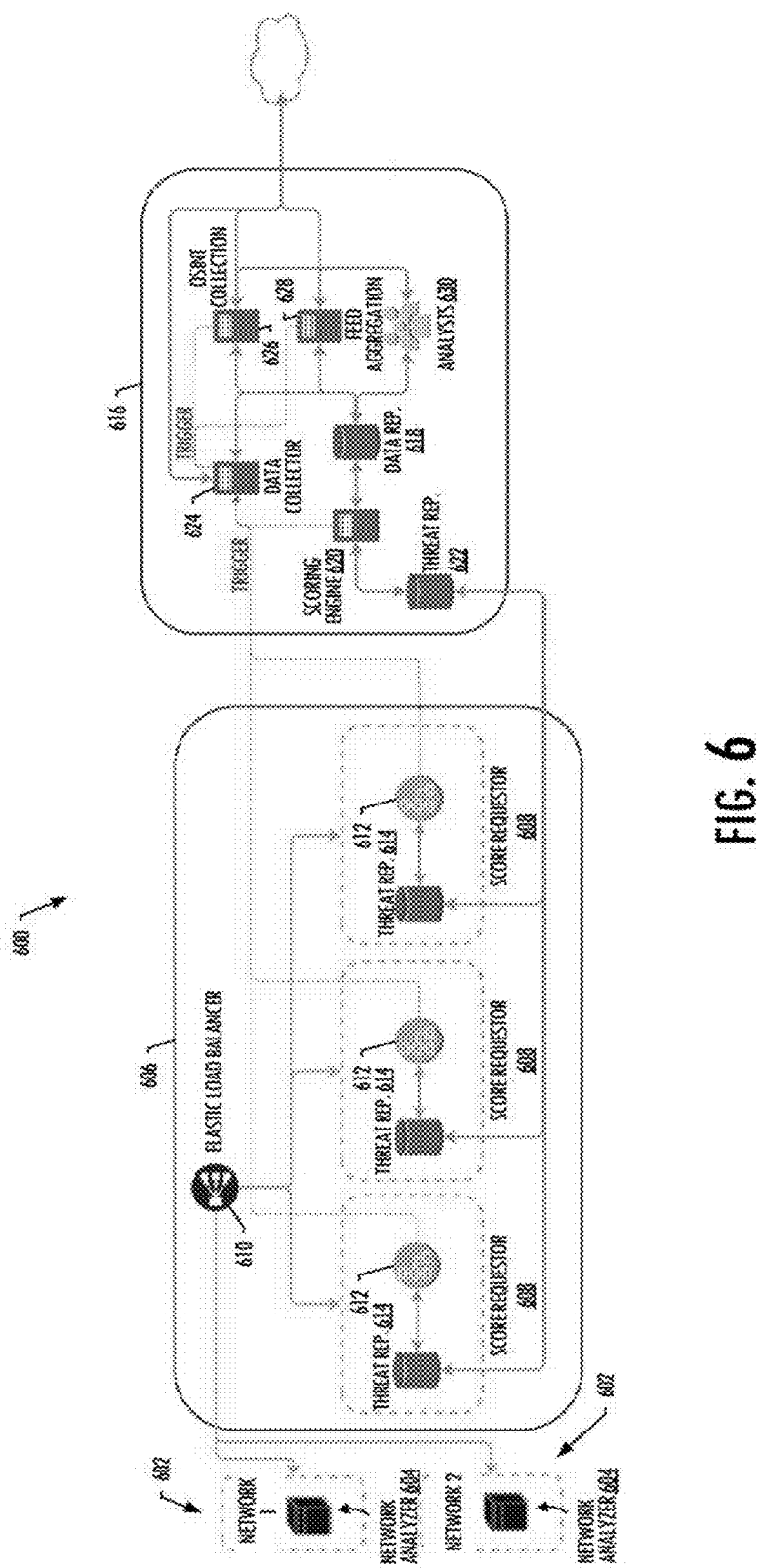
Figure 7A:
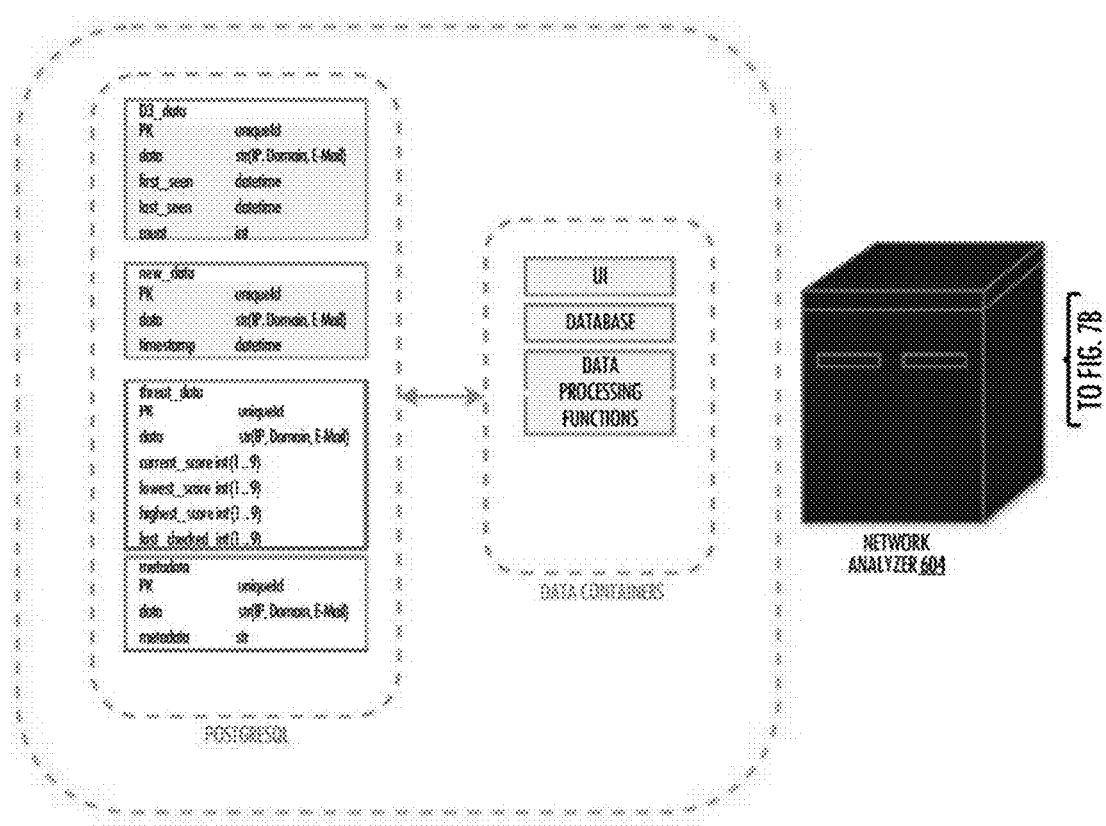
Figure 7B:
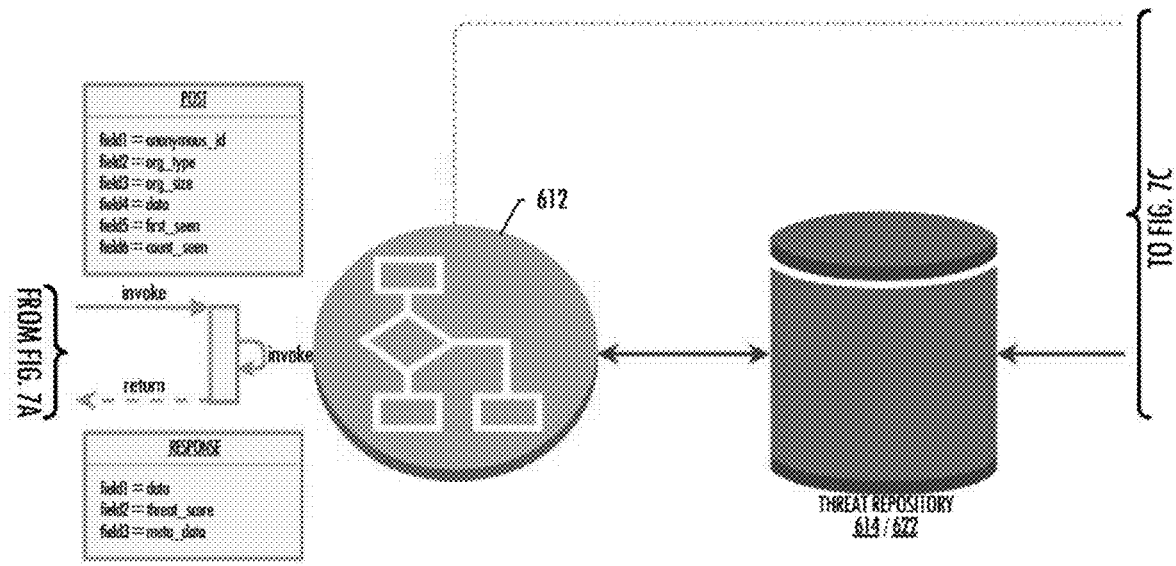
Figure 7B:
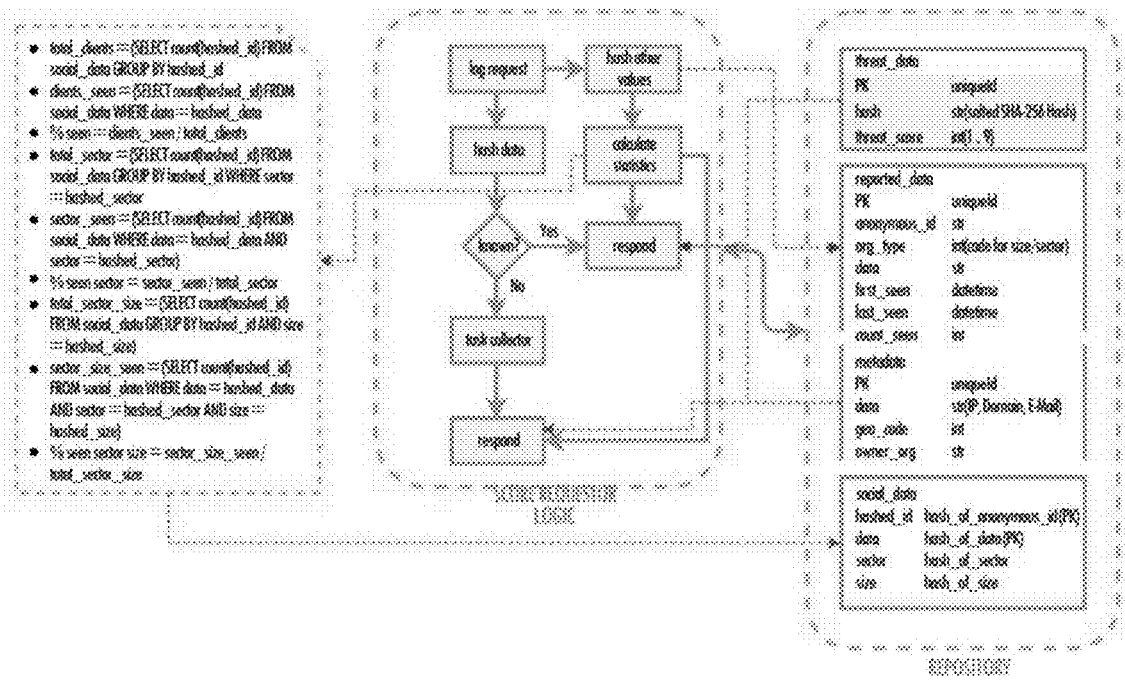
Figure 7C:
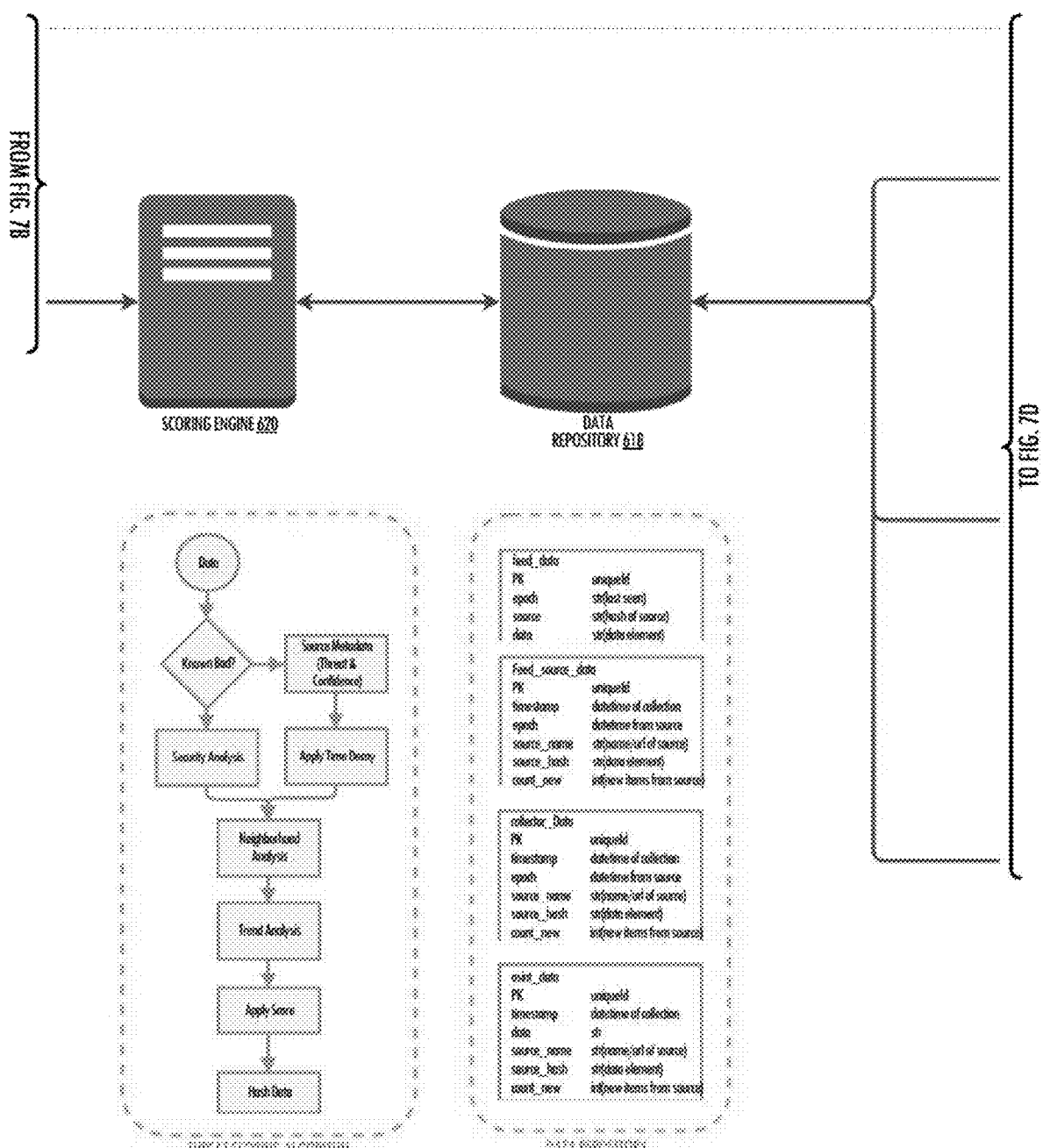
Figure 7D:
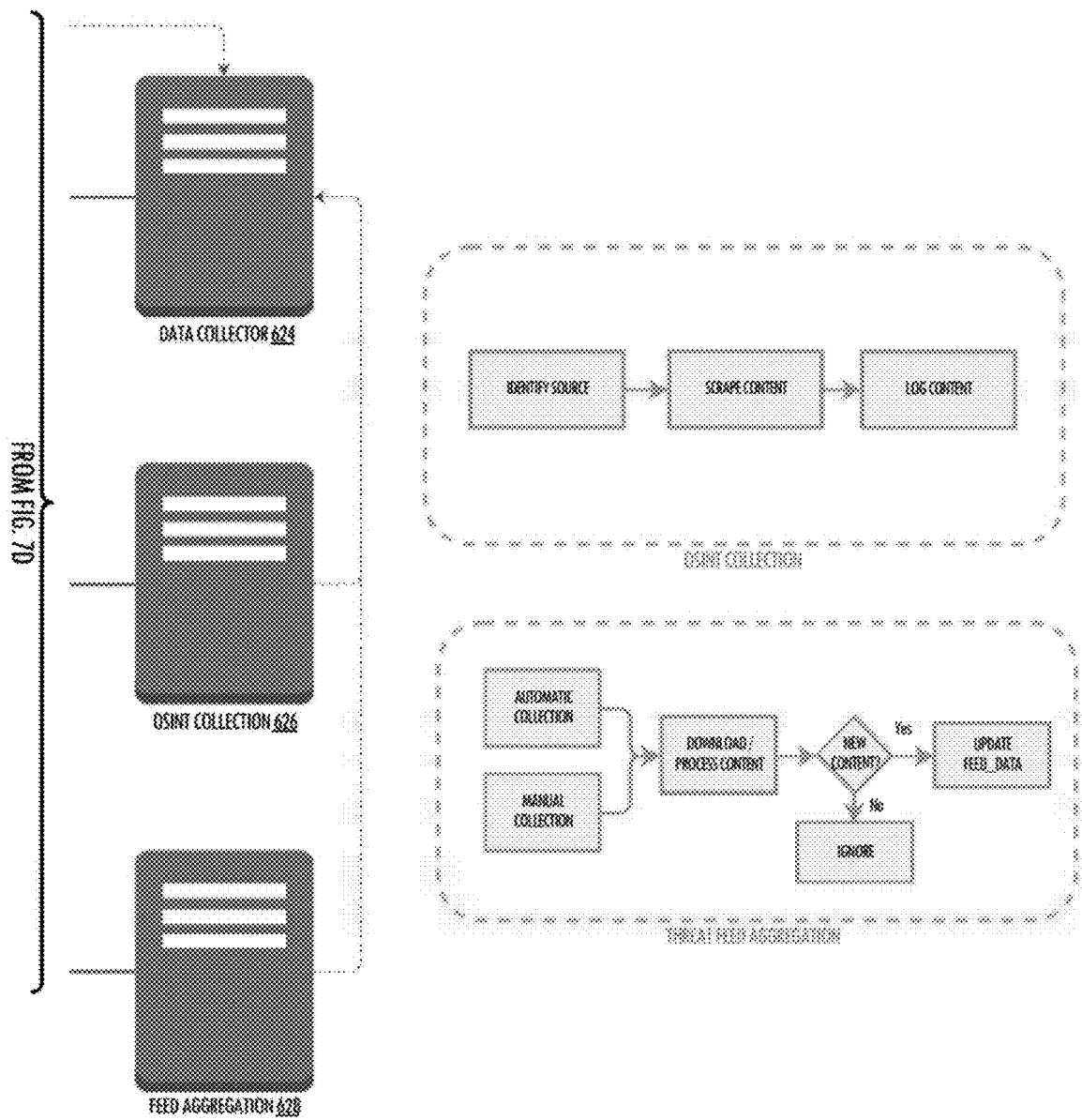

FIG. 6 illustrates a more particular configuration of a system 200 that in some examples may correspond to the system 100 of FIG. 1, and FIGS. 7A-7D illustrate various logic and data structures that may be employed by subsystems, components and the like of the system 600. As shown, the system 600 may include one or more computing device networks 602 (e.g., local area networks—LANs) each of which may be equipped with one or more network analyzers 604, which may correspond to network analyzers 102. The network system may also include a bank 606 with a plurality of score requestors 608 each of which may correspond to a score requestor 104, and whose workload supporting the network analyzers may be balanced by an elastic load balancer 610. Each score requestor may include logic 612 and a threat score repository 614 that in some examples may correspond respectively to logic 512 and threat score repository 304.

As also shown, the system 200 may include a security operations center (SOC) 616. The SOC may include a data repository 618 and scoring engine 620 that may in some examples correspond to respectively data repository 108 and scoring engine 106. The SOC may include a threat score repository 622, which may be fed by the threat score repositories 614 of the score requestors 608 and store the same information for use by the data repository and scoring engine at the SOC. In other examples, the score requestors may not include dedicated threat score repositories and instead utilize only the threat score repository at the SOC. And in yet other examples, the threat score repositories of the score requestors may feed directly to the data repository and scoring engine without a separate threat score repository at the SOC.

The SOC 616 may include one or more additional subsystems, components and the like. As shown, for example, the SOC may include a data collector 624, open-source intelligence (OSINT) collection subsystem 626 and/or feed aggregation subsystem 628. And as also shown, in some examples, the SOC may also make use of one or more analysts 630.

Figure 8:
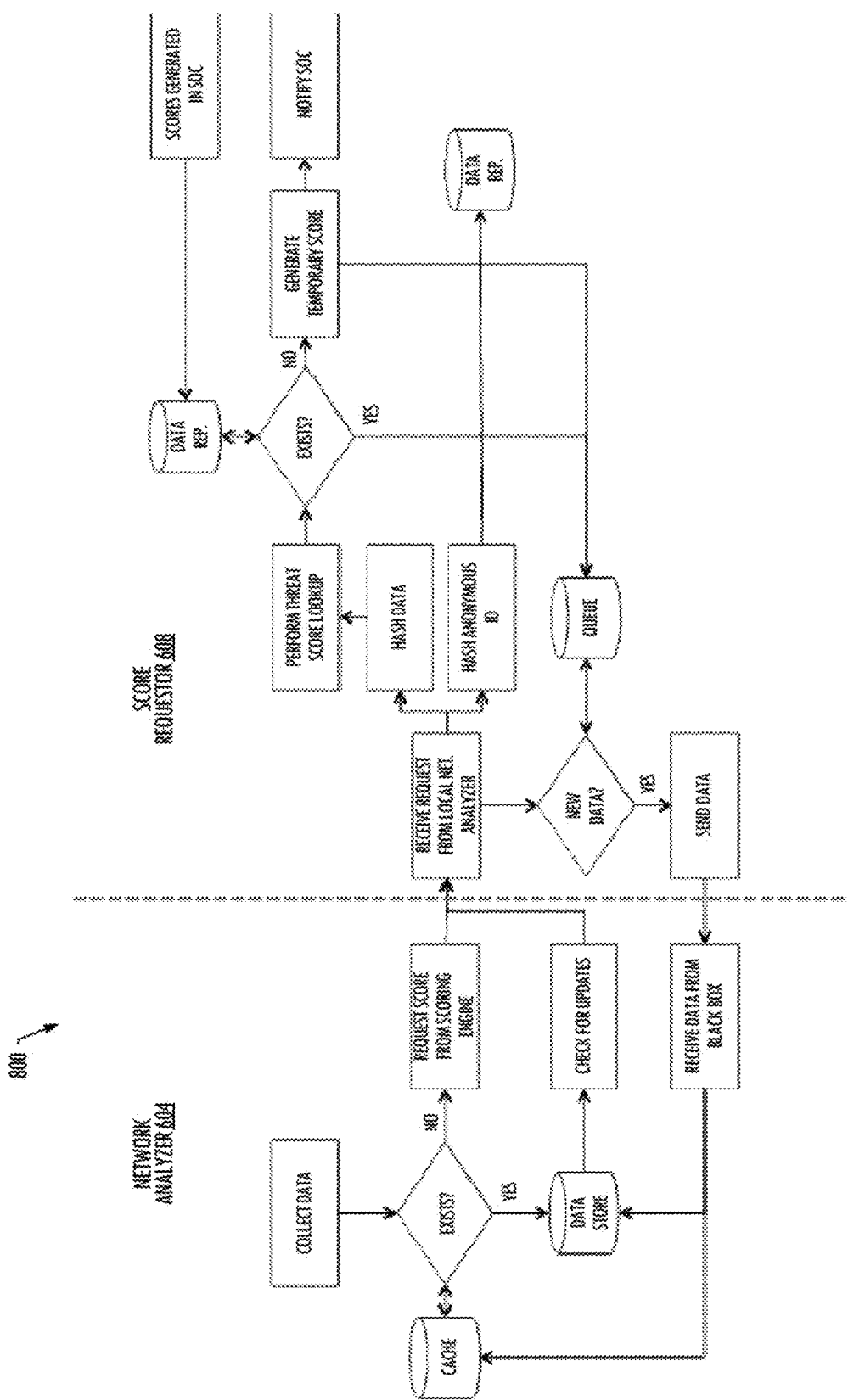

FIG. 8 is a flowchart illustrating various steps in methods 800 according to example implementations of the present disclosure, including steps performed at a network analyzer 604 and at a score requestor 608. The method may include data collection with a computing device network 602. This data may be anonymized upon ingest into the system 600 by removing context associated with the network traffic. For example, a log entry containing detail on communications with a specific internal server on a network from an external IP address at a specific date and time may be rendered down into discrete data elements that each contains just and individual IP and a timestamp field. As the local network analyzer processes this data, a lookup against a local cache may be performed to determine if that external IP address has been recently seen on the local network. If so, a count for "seen" is increased and the "last seen" field in a local database or data repository may be updated to this most recent timestamp.

If the external IP address has not been seen before on the computing device network 602, a request may be sent to the score requestor 608 via an application programming interface (API) call that transmits the following data: a hashed version of the anonymous ID for the computing device utilizing a customized hashing function that is unique for each computing device, the external IP address, the timestamp field, and/or any other necessary metadata. At this time, the API call may also check a queue within the score requestor to determine if any information is waiting for delivery from the score requestor. If information is available, that data may then be written to the local data repository and the cache.

At the score requestor 608, whenever an API call is received, three activities may occur. First, the hashed anonymous ID of the computing device may be again hashed using a protected hashing function known only to the an operator of the system 600, then the user-provided anonymous ID hash may be immediately discarded and the new hash associated with the inbound data request. The content of the data request may then be stored within the data repository 618 to support analytics.

Second, the data (e.g., external IP address) may be hashed, and that hash may be utilized to perform a lookup against the threat score repository to determine if a threat score is known. If a known score exists, that score may be written to the queue. If a known score does not exist, the score requestor 608 may generate a temporary score using a threat-scoring algorithm, and that temporary score may be written the queue. At this time, the score requestor may also send a notification to the SOC 616 that a temporary score has been generated, enabling an SOC analyst 630 to determine a more robust score.

Third, the API call may check the queue to determine if any threat scores and additional data exist for the computing device based on the hash associated with the request; and if so, this data within the queue may be returned to the computing device.

Figure 9:
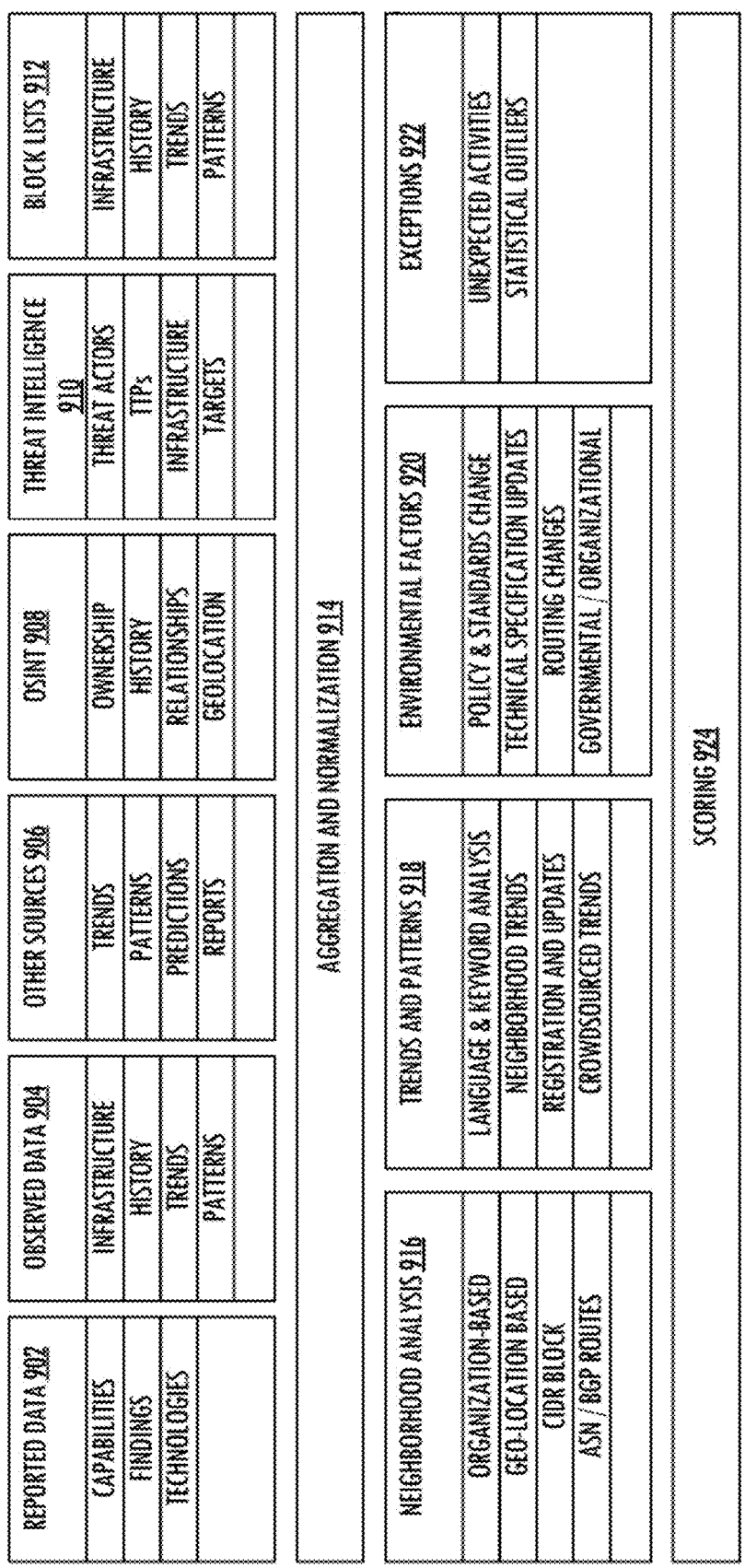

According to example implementations, the scoring engine 608, 620 score requestor 104, 608 or the like may be configured to calculate the aforementioned scores in any of a number of different manners. FIG. 9 illustrates signal-based threat scoring 900, according to some example implementations. As shown, the threat-scoring performed by the scoring engine 108, 620 score requestor 104, 608 or the like may include the receipt of data from a number of different sources, such as reported data 902, observed data 904, other sources 906, OSINT 908, threat intelligence 910 and/or block lists 912.

Reported data 902 may come from an organization, such as a governmental, commercial or non-profit organization, and provide insight into capabilities that exist, both from the perspective of an "attacker" and a "defender." This information may also include findings from studies and reports or information on the evolution of technologies. Technological evolution may refer to either security-based technologies or technologies used to enable network activities.

Observed data 904 may come from one or more end point networks (e.g., computing device networks 602) either shared in real-time, near real-time or manually. Observed data may provide information on the behaviors associated with a specific network to include both "good" traffic and "bad" traffic is included within this data set. This data may provide the ability to perform crowd sourced analysis of trends and activities from real-world networks. Observed data may also be provided through "honeypot" networks to augment the observed data set and provide control data for the delineation between "good" and "bad" network activities.

Other sources of data 906 may include reports and analysis that may not be specifically reported or shared and could come from a variety of sources. These data sources may provide information on patterns and trends in network activities, and may be used to augment other data sources.

OSINT 908 may provide a large data set as a baseline for signal-based threat scoring activities. OSINT may include information such as that which is normally contained within WHOIS data sets for IP addresses and domain names. It may also include information related to publicly-traded companies, popular domain names based on traffic, information collected through data aggregators, and other means of collection.

Threat intelligence 910 may include the combination of multiple data types to include indicators of network activity (e.g., IP address, domain name, e-mail address), some form of identification of a threat actor (by individual or group) and information related to a larger set of activity (e.g., campaigns). Threat intelligence may provide information on the tactics, techniques and procedures utilized by a threat actor in targeting a system. It may also at times include information related to the motivations behind threat actor's activities and how they identify targets. Threat intelligence within signal-based threat scoring 900 may provide the ability to correlate trends and patterns of threat actor activity with other data collected within the system. It may also provide information that enables the discovery of potential correlation between trends and threat actor activities.

Block lists 912 may include information provided with a low level of context and may be utilized to block known bad hosts, spam hosts or hosts otherwise identified as bad actors. Block lists within signal-based threat scoring 900 may provide a large number of low fidelity signals and serve to help identify trends and filter out unnecessary noise within the system.

As also shown, the signal-based threat scoring 900 may include aggregation and normalization logic 914, at which stage the benefit of signal-based threat scoring may be first realized. Within typical threat analysis and risk scoring functions, it may be necessary to understand the methods behind the data collection to better understand confidence and threat. In addition, traditional means may require the ability to distinguish between the potential level of threat across a large number of disparate sources (e.g., is botnet A worse than botnet B). In accordance with the signal-based threat scoring of example implementations, each input may be treated as a signal of potentially malicious activity and provide a simple rating scale that allows for the initial estimation of threat and confidence. The benefit is not from the scoring of the individual elements, rather the combination of all elements at scale. This may also provide the benefit of removing the need for human analysis within the process. Trends and patterns may be detected at scale, and through the following processes, levels of confidence may be achieved based on variables such as time, neighborhood analysis, and social network graph analysis.

The aggregation performed by the aggregation and normalization logic 914 may involve the collection of common metadata across the entirety of the sources identified such as the first time detect, last time seen, number of times seen, associated data (e.g., domain is related to IP x.x.x.x at the time of detection). This data may be normalized and stored in a common data set that obfuscates the source of the data through the use of a hashing function against the source identifier. The end result may be a database of signals of potential threat activity and an associated score for the potential threat for each unique data element. Deduplication may occur based on the source to minimize the effect of the same data element being reported by the same source multiple times.

The aggregated and normalized data set may provide the foundation for further threat scoring and analysis activities as described below. And in this regard, the signal-based threat scoring 900 may further include logic for one or more of neighborhood analysis 916, trends and patterns 918, environmental factors 920 or exceptions 922.

The neighborhood analysis logic 916 may group data collected based on multiple perspectives of a potential neighborhoods (e.g., country, region, city, top level domain (tld), CIDR block, ASN Routes, and registration/update dates). Understanding the ranking within these neighborhoods and the movement therein may provide the ability to better understand the behavior of threat activity and to identify patterns and trends within the data sets.

The trends and patterns logic 918 may analyze the aggregated data for trends in a large data set of "potentially malicious" data. These trends may be identified in any of a number of different manners, such as through semantic analysis, temporal analysis, or social graph analysis. Through the tracking of changes and updates across this data set as new attack patterns emerge, the trend and pattern analysis logic may enable the prediction of potential future activities.

The infrastructure of the Internet relies on a complex body of policies, standards, and best practices that change over time. The environmental factors logic 920 may analyze these environmental factors, and the incorporation of this analysis with the analysis of potentially malicious activities may facilitate an understanding of the relationship between changes in environment with changes in threat actor behaviors.

By collecting a large amount of data in an aggregated and normalized fashion, the ability to detect exceptions within the data becomes more interesting. And this may be performed by the exceptions logic 922. The signal-based threat scoring 900 may therefore provide the ability to discover new threats based on these exceptions, while also understanding the significance across a much larger data set. For example, while an exception may be interesting at a point in time, it may become less interesting very quickly if not related to other threat activity (e.g., a blip on a radar), but may still be maintained as a signal.

Further, as shown, the signal-based threat scoring 900 may include scoring logic 924, which may apply a final score to each discrete network element (e.g., IP, domain, email). This may accomplished by applying an aggregate of threat scores identified throughout the process and influencing that threat score with an element of decay. In some examples, the speed of decay may change based neighborhood and environmental factors. For example, an IP address identified with a high threat score within a "bad neighborhood" may decay much slower than an IP address identified in a "good neighborhood."

Further as scores may be based on the aggregation of the data collected throughout the process, threat scores may be more dynamic than traditional approaches to threat scoring. In some examples, then, an intermediary device such as a score requestor 104, 608 may be used to revisit and repopulate scores, as appropriate.

FIG. 10 illustrates a flowchart including various operations of a method 1000 performed at a network analyzer for anonymously detecting and blocking threats within a telecommunications network, in accordance with an example implementation of the present disclosure. As shown at block 1002, the method may include intercepting or receiving log files related to traffic that passes over the telecommunications network. The method may also include collecting metadata including values of data attributes associated with the traffic, as shown at block 1004. The method may also include generating and transmitting a request for an associated threat score for the value of a data attribute of the data attributes, as shown at block 1006. The request includes at least the value of the data attribute. As shown at block 1008, the method may also include receiving the associated threat score and based thereon initiating a block or redirection of the traffic.

FIG. 11 illustrates a flowchart including various operations of a method 1100 performed at a score requestor for anonymously detecting and blocking threats within a telecommunications network, in accordance with an example implementation of the present disclosure. As shown at block 1102, the method may include receiving a request for an associated threat score for a value of a data attribute. The request is received from a network analyzer. The method also include determining if the associated threat score is locally stored at the score requestor, as shown at block 1104. The determining step may include including returning the associated threat score to the network analyzer in an instance in which the associated threat score is locally stored at the score requestor after having been previously requested by another network analyzers; or otherwise, generating a secondary request for the associated threat score. The secondary request includes a transformation of the value to remove any portion from which the network analyzer is identifiable. The determining step may further include transmitting the secondary request to a scoring engine configured to receive the secondary request, and in response thereto, calculate the associated threat score and the associated threat score to the score requestor to return to the network analyzer. The network analyzer is configured to initiate a block or redirection of the traffic based on the associated threat score.

According to example implementations of the present disclosure, the systems 100, 600 and their respective subsystems and/or components including the network analyzer 102, 604 score requestor 104, 608, scoring engine 106, 620 and/or data repository 108, 618 and the subcomponents thereof may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein, such as the network analyzer 102, 604 score requestor 104, 608, scoring engine 106, 620 and the like. In examples involving more than one apparatus, the respective apparatuses may be connected to or otherwise in communication with one another in a number of different manners, such as directly or indirectly via a wired or wireless network or the like.

FIG. 12 illustrates an apparatus 1200 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1202 (e.g., processor unit) connected to a memory 1204 (e.g., storage device).

The processor 1202 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1204 (of the same or another apparatus).

The processor 1202 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1204 is generally any piece of computer hardware that is capable of storing information such as, for example, data (e.g., traffic metadata repository 202, threat score repository 204, 304, and request database 406), computer programs such as computer-readable program code 1206, and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/ write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include one or more input interfaces 1208 (e.g., user input interfaces), a display 1210, and/or communications interface 1212 (e.g., communications unit). The input interfaces 1208 may be wired or wireless, and may be configured to receive information from a user into the apparatus, such as for processing, storage and/or display. Suitable examples of input interfaces include a microphone, image or video capture device, keyboard or keypad, joystick, touch-sensitive surface (separate from or integrated into a touchscreen), biometric sensor or the like. The input interfaces may further include one or more interfaces for communicating with peripherals such as printers, scanners or the like.

The display 1210 may be configured to present or otherwise display information to a user, suitable examples of which include a liquid crystal display (LCD), light-emitting diode display (LED), plasma display panel (PDP) or the like. The communications interface 1212 may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together.

Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1200 may include a processor 1202 and a computer-readable storage medium or memory 1204 coupled to the processor, where the processor is configured to execute computer-readable program code 1206 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A score requestor of a system for anonymously detecting and blocking threats within a telecommunications network, the system including the score requestor, a scoring engine, and a plurality of network analyzers, each of the plurality of network analyzers monitoring network traffic from a different telecommunications network, the score requestor comprising:

a processor and a memory storing executable instructions that, in response to execution by the processor, cause the score requestor to at least:
receive, from each one of the network analyzers:
an initial request for an associated threat score for a value of a data attribute of the network traffic that passed over the respective telecommunications network, wherein the network analyzer is configured to collect metadata including the value of the data attribute, and interpret the metadata and therefrom generate the request including at least the value of the data attribute; and
for each of the requests:
serve a secondary request to the scoring engine based on the initial request representing a transformation of the value to remove any portion from which the requesting network analyzer is identifiable;
receive a response from the scoring engine which includes a calculated associated threat score, generated from aggregate metadata associated with prior values of data attributes that were received from at least one other network analyzer and based thereon determines whether the value of the data attribute is associated with a known or predicted threat, for distribution to the respective network analyzers, wherein each one of the network analyzers is configured to initiate a block or redirection of the traffic based on a relationship between the respective associated threat score and a predetermined risk threshold for the telecommunications network.

2. The score requestor of claim 1, wherein the data attributes include sources and destinations of the traffic, network port and network protocol identifiers associated with the traffic, dates and timestamps of the traffic, data volume, and frequency and pattern identifiers of the traffic.

3. The score requestor of claim 1, wherein each of the network analyzers are configured to encrypt and then transmit the request in such a format that the network analyzer is not identifiable to a third party, and the score requestor is configured to decrypt and then serve the request.

4. The score requestor of claim 1, wherein the score requestor receives the request from, and serves the request to, the network analyzer respectively includes being configured to assign a token to the request upon receipt, and return the associated threat score to the network analyzer based at least in part on the token.

5. A computer-readable storage medium for implementing a score requestor of a system for anonymously detecting and blocking threats within a telecommunications network, the system including a scoring engine, and a plurality of network analyzers, each of the plurality of network analyzers monitoring network traffic from a different telecommunications network, the computer-readable storage medium having computer-readable program code stored therein that, in response to execution by a processor, cause the score requestor to at least:

receive, from each one of the network analyzers:
an initial request for an associated threat score for a value of a data attribute of the network traffic that passed over the respective telecommunications network, wherein the network analyzer is configured to collect metadata including the value of the data attribute, and interpret the metadata and therefrom generate the request including at least the value of the data attribute; and for each of the requests:
serve a secondary request to the scoring engine based on the initial request representing a transformation of the value to remove any portion from which the requesting network analyzer is identifiable;
receive a response from the scoring engine which includes a calculated associated threat score, generated from aggregate metadata associated with prior values of data attributes that were received from at least one other network analyzer and based thereon determines whether the value of the data attribute is associated with a known or predicted threat, for distribution to the respective network analyzers, wherein each one of the network analyzers is configured to initiate a block or redirection of the traffic based on a relationships between the respective associated threat score and a predetermined risk threshold for the telecommunications network.

6. The computer readable storage medium of claim 5, wherein the data attributes include sources and destinations of the traffic, network port and network protocol identifiers associated with the traffic, dates and timestamps of the traffic, and frequency and pattern identifiers of the traffic.

7. The computer readable storage medium of claim 5, wherein each of the network analyzers are configured to encrypt and then transmit the request in such a format that the network analyzer is not identifiable to a third party, and the score requestor is configured to decrypt and then serve the request.

8. The computer readable storage medium of claim 5, wherein the score requestor receives the request from, and serves the request to, the network analyzer respectively includes being configured to assign a token to the request upon receipt, and return the associated threat score to the network analyzer based at least in part on the token.

9. A system for anonymously detecting and blocking threats within a telecommunications network, the system comprising:

a score requestor, a scoring engine, and a plurality of network analyzers, each of the plurality of network analyzers monitoring network traffic from a different telecommunications network;

the score requestor comprising a processor and a memory storing executable instructions that, in response to execution by the processor, cause the score requestor to at least:
receive, from each one of the network analyzers:
a request for an associated threat score for a value of a data attribute of the network traffic that passed over the respective telecommunications network, wherein the network analyzer is configured to collect metadata including the value of the data attribute, and interpret the metadata and therefrom generate the request including at least the value of the data attribute; and for each of the requests:
serve the request from the scoring engine based on a secondary request without the value and instead including a transformation of the value to remove any portion from which the requesting network analyzer is identifiable; and the scoring engine comprising a processor and a memory storing executable instructions that, in response to execution by the processor, cause the scoring engine to at least:
calculate, for each of the secondary requests, the associated threat score by aggregating metadata associated with prior values of data attributes that were received from another network analyzer, and based thereon determine whether the value of the data attribute is associated with a known or predicted threat; and wherein each one of the network analyzer is configured to initiate a block or redirection of the traffic based on the respective associated threat score.

10. The system of claim 9, wherein the network analyzer comprises:

a processor and a memory storing executable instructions that, in response to execution by the processor, cause the network analyzer to at least:
collect metadata including values of data attributes associated with the traffic based on the traffic so intercepted or log files so received;
interpret the metadata and therefrom generate the request for an associated threat score for the value of a data attribute of the data attributes, the request including at least the value of the data attribute;
transmit the request to the score requestor; and receive the associated threat score from the score requestor and based thereon initiate a block or redirection of the traffic based on a relationship between the respective associated threat score and a predetermined risk threshold for the telecommunications network.

11. The network analyzer of claim 10, wherein the data attributes include sources and destinations of the traffic, network port and network protocol identifiers associated with the traffic, dates and timestamps of the traffic, data volume, and frequency and pattern identifiers of the traffic.

12. The network analyzer of claim 10, wherein the memory stores further executable instructions that, in response to execution by the processor, cause the network analyzer to further at least:

determine if the associated threat score for the value of the data attribute is locally stored at the network analyzer, the network analyzer being caused to generate and transmit the request, and receive the associated threat score from the score requestor, in an instance in which the associated threat score is not locally stored at the network analyzer; and in another instance in which the associated threat score is locally stored at the network analyzer, retrieve the associated threat score from local storage of the network analyzer and based thereon automatically initiate the block or redirection of the traffic.

13. The network analyzer of claim 10, wherein the network analyzer being caused to initiate the block or redirection of the traffic includes being caused to at least:

notify an end-user of a threat associated with the traffic, and initiate the block of the traffic, in an instance in which the associated threat is above the predetermined threshold; or otherwise, initiate the redirection of the traffic to an identified source or destination in an instance in which the associated threat is below a predetermined threshold.

* * * * *